Figure 6:
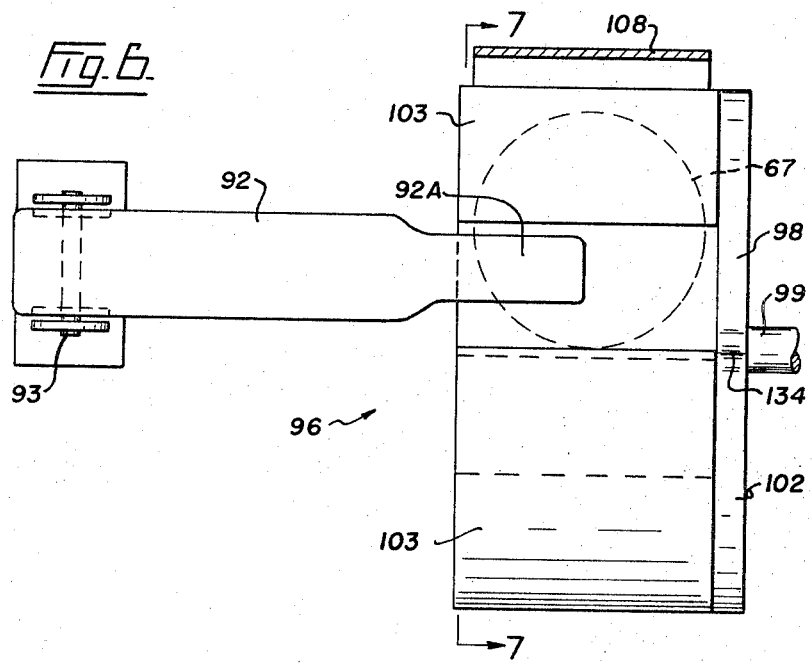

United States Patent [19]
Raitt

[11] 3,838,791

[45] Oct. 1, 1974

[54] MACHINE FOR DISPENSING ICE CREAM FROM A PACKAGE

[76] Inventor: Edward D. Raitt, 5525 Blenheim St., Vancouver, British Columbia, Canada

[22] Filed: Aug. 6, 1973

[21] Appl. No.: 386,172

[52] U.S. Cl............... 221/225, 99/478, 198/20, 221/11, 221/30, 221/119, 221/198
[51] Int. Cl............................................. B65b 5/00
[58] Field of Search................. 221/76, 79, 11–13, 221/81–86, 119, 104, 105, 112, 113, 150 B, 225–228, 230, 197, 198, 26, 30, 32; 198/20 R, 23; 99/470, 478

[56] References Cited
UNITED STATES PATENTS

| | | | |
|---|---|---|---|
| 510,626 | 12/1893 | Zeller | 198/23 |
| 1,675,260 | 6/1928 | Edmunds | 198/20 |
| 2,222,862 | 11/1940 | Tratsch | 221/81 |
| 2,381,502 | 8/1945 | Lang | 198/20 |
| 2,524,673 | 10/1950 | Martin | 221/150 B |
| 2,835,787 | 5/1958 | Mihalyi | 221/198 |
| 3,057,528 | 10/1962 | Cole et al. | 221/30 |

Primary Examiner—Robert B. Reeves
Assistant Examiner—H. Grant Skaggs, Jr.
Attorney, Agent, or Firm—Fetherstonhaugh & Co.

[57] ABSTRACT

A machine for dispensing packaged ice cream scoops is provided with a conveyor for moving the open-ended packages to a dispensing position adjacent an ejecting mechanism. The mechanism has a member which progressively moves through the package to eject the scoops usually one at a time. A cut-off device breaks adhesion between each ejected scoop and an adjoining scoop. The ejected scoop falls into a feeder wheel which directs it through a discharge opening. A control circuit is provided to operate the machine automatically once the circuit is energized by the closing of a manually operated switch.

7 Claims, 8 Drawing Figures

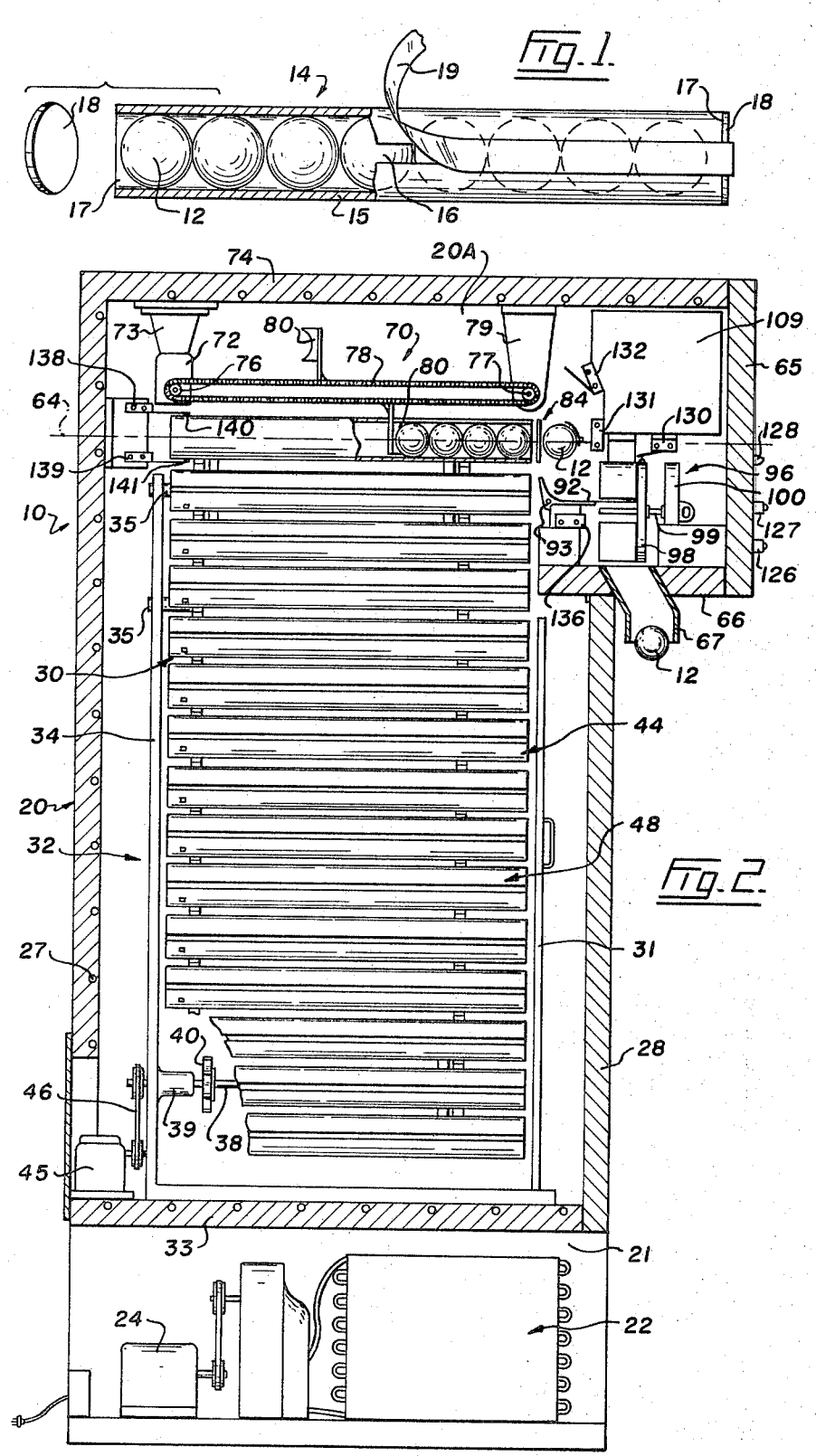

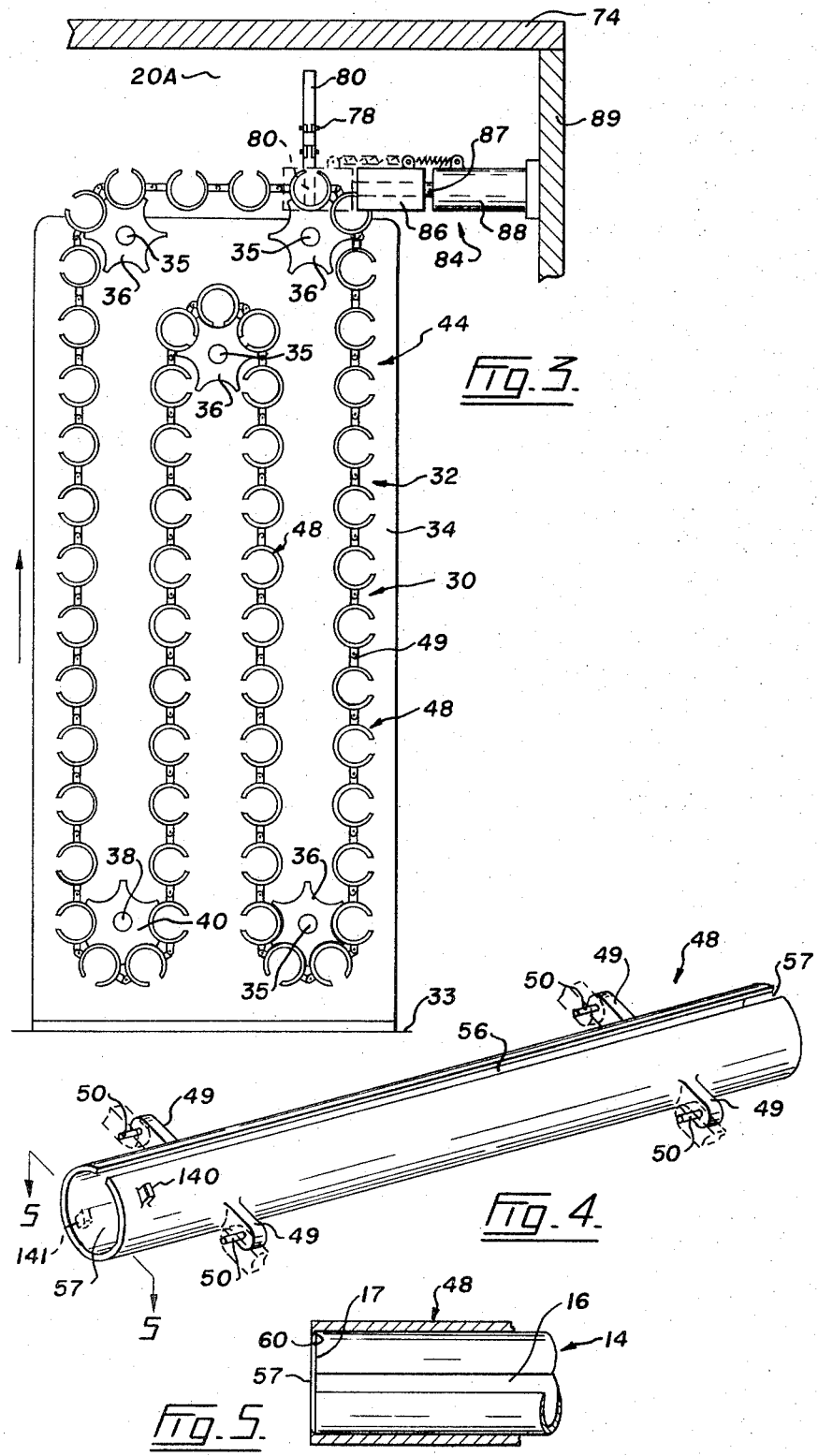

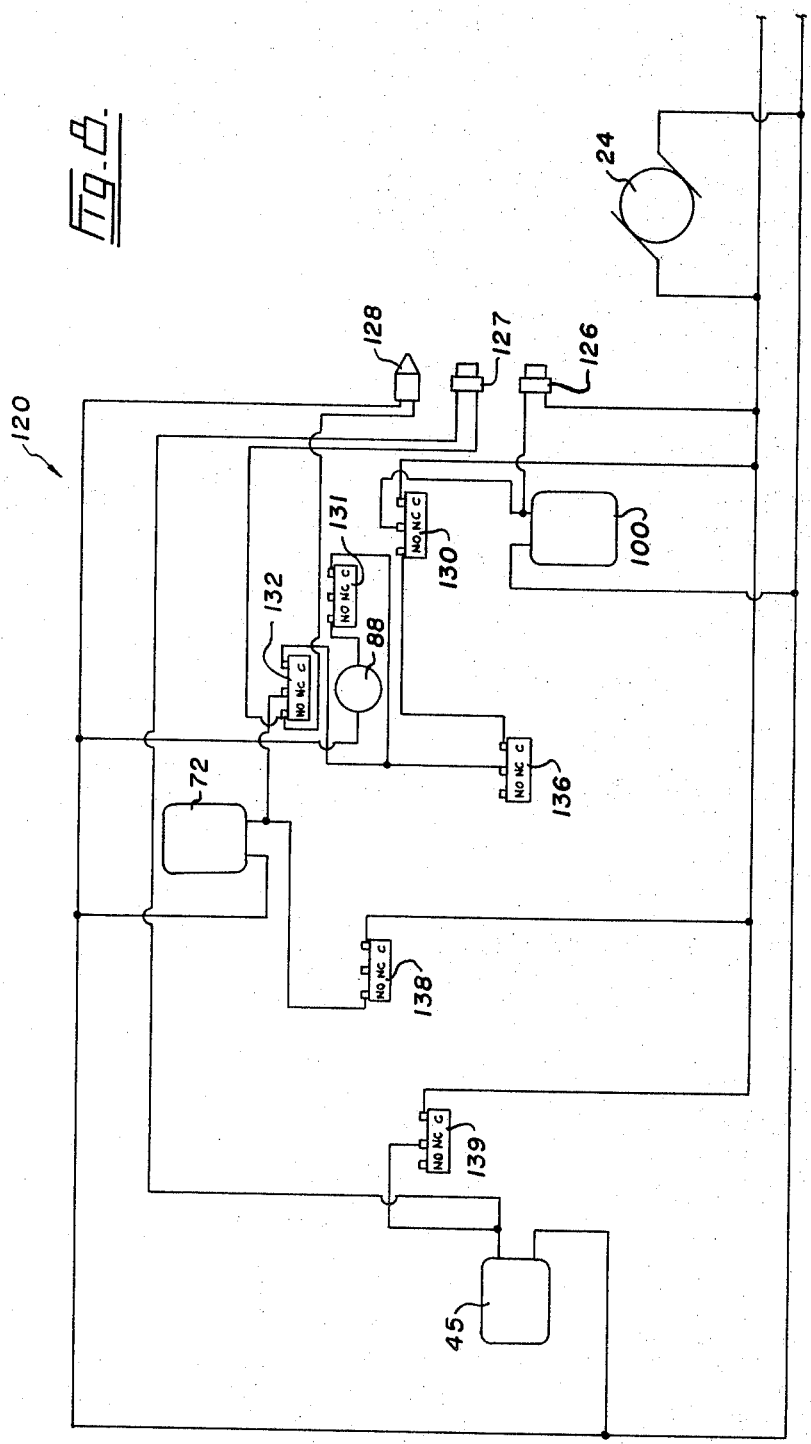

MACHINE FOR DISPENSING ICE CREAM FROM A PACKAGE

This invention relates to a product dispensing machine and more particularly to a machine which is capable of dispensing pre-packaged scoops of hard ice cream.

The task of serving hard frozen ice cream from a large container takes an undesirable amount of time and as a result, retailers of this extremely popular product have welcomed the advent of pre-packaged ice cream or, more correctly, ice cream formed into spherical scoops and temporarily stored in a carton or the like. However, someone is still required to remove the individual scoops from the frozen mass contained within the carton and to place the scoop individually in a cone or on a plate. Although less time is spent serving ice cream in this manner, the manual dispensing of pre-packaged ice cream is not a completely satisfactory answer to the problem.

The dispensing machine which forms the basis of this invention can store a large quantity of pre-packaged ice cream at a suitably reduced temperature and will operate automatically when activated by a control switch to serve the required number of scoops. Since the ice cream comes into contact with only a few parts of the machine, acceptable standards of hygiene are achieved and periodic cleaning of those few parts will maintain those standards.

Figure 7:
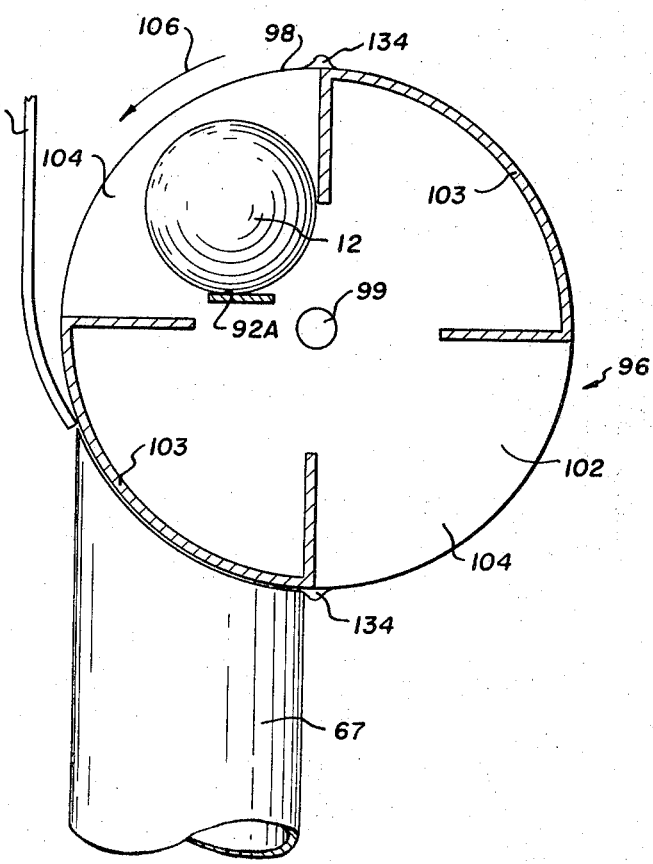

In drawings which illustrate a preferred embodiment of the invention,

FIG. 1 is a plan, part in section, showing a package for the ice cream dispensed from the present machine, FIG. 2 is a vertical section of an ice cream dispensing machine in accordance with the present invention, FIG. 3 is a front elevation of a conveyor for the machine, FIG. 4 is a perspective view of a conveyor holder, FIG. 5 is a horizontal fragmentary section taken on the line 5—5 of FIG. 4, FIG. 6 is a plan of a feeder device for the machine, FIG. 7 is a vertical section taken on the line 7—7 of FIG. 6, and FIG. 8 is a diagram of a control circuit for the machine.

Referring first to FIGS. 1 and 2, the machine generally indicated at 10 in FIG. 2 is designed to serve ice cream which is prepackaged by the supplier for delivery to the retail outlet. This requires that the ice cream manufacturer shape his product into spherical scopes 12 which are inserted into a package 14 such as is shown in FIG. 1. Preferably, the package 14 comprises a cylindrical sleeve 15 of cardboard or plastic having a longitudinal slot 16 which extends between the two open ends 17 of the sleeve. End caps 18 are used as closures for the open ends of the sleeve 14. After the package 14 is filled with ice cream scoops, a length of adhesive tape 19 is used to close the slot 16 and secure the end caps 17 in position. The package can be made in other ways, of course, as long as the filled package can be opened to provide a longitudinal slot and uncovered ends. The filled packages 14 are shipped on order to the retailed who stores them in the machine 10 ready for sale to the public.

In order to store the ice cream at a suitable low temperature, the machine 10 is constructed as an insulated cabinet 20, see particularly FIG. 2. Cabinet 20 has a hollow base 21 which encloses a conventional refrigerating unit 22 powered by an electric motor 24. The unit 22 circulates refrigerant through the usual tubes 27 carried by some of the enclosing walls of the cabinet 20.

The front of the cabinet 20 is fitted with an outer door 28 which provides access to the interior so that ice cream packages 14 can be loaded into a conveyor 30 (FIGS. 2 and 3) of the machine. A transparent inner door 31 may be provided to guard against loss of cold air from the interior of the cabinet. The conveyor, indicated generally at 30, is mounted on a frame 32 which is supported on bottom wall 33 of the cabinet. A rear upright 34 of the frame carries a number of horizontal shafts 35 and rotatably mounted on each of these shafts is a pair of sprockets 36. Another driven shaft 38 is journalled in a bearing 39 (FIG. 2 only) secured to the upright 34 and this shaft is fitted with non-rotatable sprockets 40. Trained around the sprockets 36 and 40 is an endless belt 44 which is driven by an electric motor 45, this motor being mounted on cabinet wall 33 and operatively connected as at 46 to the shaft 38. FIG. 3 shows the preferred arrangement for the belt 44 since it can carry large number of ice cream packages 14 but it will be understood that the belt may be trained over more or fewer sets of differently arranged sprockets than are shown according to the desired carrying capacity of the conveyor.

The belt 44 is a track-like structure constructed of tubular holders 48 which are fitted with laterally projecting lugs 49, the lugs being hingedly connected together by pins 50 as shown best in FIG. 4. A longitudinal slot 56 extends between open ends 57 of the holder.

To load the conveyor 30 with the ice cream packages 14, the adhesive tapes 19 are pulled off and are discarded along with the end caps 18. An opened package 14 is pushed into each empty holder 48 with the slot 16 of the package in register with the slot 56 of the holder. In FIG. 5, it will be seen that one end 57 (the right end as the conveyor 30 appears in FIG. 2) is provided with inwardly projecting flanges 60 which engage the adjoining end 17 of the package. The longitudinally divided holder 48 is slightly flexible around its circumference and therefore the filled and frozen package 14 will spring the holder as it is forced therein whereupon the flanges 60 will snap over the package end 17. Thus the package 14 is held within the holder 48 with a force sufficient to prevent endwise movement of the package as the scoops 12 are ejected.

The conveyor 30 is adapted to be driven by the motor 45 to dispose each holder 48 in turn in a dispensing position at the top of the cabinet 20, the position being designated by chain dotted line 64 in FIG. 2. Preferably, the position 64 is located vertically above the right conveyor shaft 35 (FIG. 3) which is contained in an upper portion 20A of the cabinet 20. Upper portion 20A has a front wall 65 and a bottom wall 66. A discharge tube 67 extends through a suitable opening in the wall 66 and the ice cream scoops which are ejected from a package in the dispensing position 64 eventually fall through this tube to be caught by the machine operator in a waiting ice cream cone or dish.

An ejecting mechanism 70 is mounted in the cabinet portion 20A immediately above the dispensing position 64. As shown best in FIG. 2, the ejecting mechanism 70 comprises an electric motor 72 which may be supported by a bracket 73 depending from top wall 74 of the cabinet. Motor 72 has a drive sprocket 76 which is connected to a driven sprocket 77 by an endless chain 78, the latter sprocket being rotatably mounted on a depending bracket 79 carried by cabinet wall 74. The horizontal chain 78 is fitted with a pair of fingers 80 which are equally spaced apart around the circumference of the chain. The conveyor 30 is intermittently operated to place each package-filled holder 48 in turn in the dispensing position 64 or directly beneath the chain 78 whereupon the fingers 80 can enter and travel through the registering slots 16 and 56 when the ejecting mechanism is intermittently operated by the motor 72. Thus, the scoops are ejected one at a time from the right end (FIG. 2) of the package 14 and its holder.

The ejected scoop usually is stuck or frozen to an adjacent scoop and therefore the machine 10 is provided with a cut-off device 84, see particularly FIG. 3. The device 84 comprises a blade 86 which is mounted on the end of a horizontally disposed and transversely extending plunger 87 operated by a solenoid 88, which solenoid may be secured to cabinet wall 89. When the solenoid 88 is energized, the knife blade 86 is advanced between the scoops to break adhesion of the ejected scoop.

The ejected and cut-off scoop 12 falls on to a platform 92 which is mounted on a pivot shaft 93 (FIGS. 2 and 6) carried by the cabinet. This substantially L-shaped platform 92 is rocked slightly by the falling scoop and the scoop is directed forwardly by the platform so as to be received by a feeder device 96.

Referring to FIG. 2, and more particularly to FIGS. 6 and 7, the feeder device 96 will be seen to comprise a wheel 98 which is mounted on the driven shaft 99 of an electric motor 100 (FIG. 2). The wheel 98 consists of a disc 102 which is fitted with a pair of quadrants 103. These quadrants 103 are spaced apart on the disc to provide two diametrically opposed pockets 104. Platform 92 has a narrow front end 92A which projects into the wheel 98 in a position to avoid the quadrants 103 when the wheel is rotated. The motor 100 operates intermittently to rotate the wheel 98 180° at a time in the direction of arrow 106 which is shown in FIG. 7 only. A scoop 12 supported in a pocket 104 on the platform end 92A is kept from falling out of the rotating wheel 98 by means of a guide plate 108 which is suitably supported, i.e., by means of a mounting bracket 109, within the cabinet portion 20A. The lower edge of the plate 108 terminates adjacent the discharge tube 67 so that an ice cream scoop can drop from a pocket into said tube when the wheel 98 is rotated. It will be noticed that the lowermost quadrant 103 serves as a closure for the upper end of the tube 67 to reduce the loss of cold air from the cabinet 20.

In the FIG. 8 diagram, there is shown a circuit 120 for controlling the motors 45, 72 and 100 as well as the solenoid 88. This circuit 120 includes a number of control switches and the like which will now be described. Front wall 65 of the cabinet portion 20A is fitted with a manually operated dispense switch 126, a similarly operated advance switch 127, and a light bulb 128. Within the cabinet 20, and preferably mounted on the bracket 109, are switches 130, 131 and 132. Switch 130 is actuated by cams 134 (see particularly FIG. 7) mounted on the periphery of the feeder disc 102 and spaced 180° apart. Switch 131 is operated when contacted by a scoop 12 as that scoop is ejected from the discharge end of a package. Switch 132 is adapted to be actuated when engaged by either one of the fingers 80 of the ejecting mechanism.

Below the platform 92 there is still another switch 136 which is included in the circuit 120. This switch 136 is operated when the platform 92 is rocked in response to a scoop 12 falling thereon or being dislodged therefrom by rotation of the wheel 98.

The circuit 120 has two more switches 138 and 139 mounted on the rear wall of the cabinet 20 in the dispensing position 64. These switches 138 and 139 are adapted to be actuated by flanges 140 and 141 carried by the left ends of the holders 48, see FIG. 2.

The machine 10 is operated to dispense an ice cream scoop 12 by pressing switch 126 while holding a biscuit cone or other receptacle under the discharge tube 67. This causes the feeder device 96 to drop a scoop 12 through the tube 67 into the waiting cone. The several switches in the circuit 120 then cooperate to operate the ejecting mechanism 60 and deposit another scoop in the wheel 98. When the package 14 in the dispensing position is empty, the several switch cause the conveyor to rotate a distance equal to the centre to centre spacing between the holders 48 whereupon the machine 10 is brought to a halt ready to dispense scoops from the next full package.

To better understand the operation of the dispensing machine 10, let it be assumed the conveyor 30 has just been loaded and that the holder 48 in the dispensing position 64 is empty. Motor 100 is inactive at this time because switch 130 is being held in the normally open position by a cam 134 and switch 126 has not as yet been actuated. Switch 136 is closed because platform 92 is not occupied by a scoop. Switch 132 is held in the normally open position by the last finger 80 which moved beyond the right end of the conveyor 30 to stop the motor 72 and connect switch 127 to the source of power. At this time switch 138 is in the normally closed position (not depressed by a flange 140) since it is opened only during a very short interval when the conveyor 30 is running and then just shortly before conveyor movement is halted by the opening of switch 139 by a flange 141. The function of switch 138 is to move the finger 80 holding switch 132 open away so that said switch can close whereupon the machine 10 can be operated when switch 127 is depressed. Switch 139 is in the normally open position at this time and the motor 45, of course, is not running. The light bulb 128 is on indicating the holder 48 in the dispensing position 64 is empty.

The machine operator presses switch 127 for one second to start motor 45 momentarily or until switch 139 closes so that the motor can run until said switch is again opened. Since switch 138 is momentarily closed, the motor 72 runs and is now under control of switch 136 which is calling for a product and therefor the ejection means 70 is capable of running until a product is ejected on to the platform 92 whereby to open switch 136. Thus, the motors 45 and 72 are operated in timed relation until the bulb 128 goes out to indicate a package-filled holder 48 is in the dispensing position 64.

When the switch 127 is again depressed, a product can be ejected since switch 138 has activated motor 72 putting it under control of switch 132 which in turn is controlled by switch 136. A finger 80 moves through the holder-supported packed 14 to push the scoops until the right end or ejected scoop contacts the switch 131 whereupon the cut-off means 84 is actuated to sever the ejected scoop which then drops on to platform 92 and this opens switch 136. The ejected scoop 12 is now supported within a pocket 104 of the wheel resting on the end 92A of the platform.

The operator now presses switch 126 for about one-half a second to start the motor 100 and rotate the wheel 98 one-half a turn. As the wheel 98 rotates, switch 130 closes and the motor continues to run until said switch is again opened by the next cam 134. The cycle can be repeated as often as necessary each time the switch 126 is pressed to dispose a scoop. When the package 14 in the dispensing position 64 is empty, the light bulb 128 comes on to tell the operator of this condition and he can then bring the next filled holder up to the required position by actuation of the switch 127.

From the foregoing, it will be apparent the machine 10 can be operated to dispense ice cream scoops quickly and easily by the simple operation of a single switch as long as scoops remain in the dispensing position. When the light bulb 128 indicates the package in position 64 is empty, the next filled holder can be brought up to position by means of the switch 127. Otherwise the entire dispensing operation is automatic due to the arrangement of switches and the like which make up the circuit means 120.

The machine can readily be adapted to dispense ice cream of different flavors. A holder containing a package filled with ice cream of a particular flavor could be brought up to the dispensing position to eject one or more scoops provided a few additional switches were included in the circuit and an indicating light was added for each flavor.

I claim:

1. In a machine for dispensing a product from an open package, the improvement comprising a conveyor having a plurality of holders each adapted to be loaded with a product-filled package, drive means for operating the conveyor, an ejecting mechanism alongside the conveyor and having a product-engaging member, drive means for operating the ejecting mechanism, control means for coordinating the drive means of the conveyor and the ejecting mechanism to place a selected holder adjacent said ejecting mechanism and enter the product-engaging member into the package loaded into said selected holder whereby to eject a product therefrom, and cut-off means operated by the control means in timed relation with the ejecting mechanism to break adhesion between each ejected product and an adjoining product in the package.

2. A machine as claimed in claim 1, and including feeder means operated by the control means to receive each ejected product and direct it to a point of discharge from the machine.

3. In a machine for dispensing a product from a row of similar products contained in an open package, the improvement comprising a conveyor having a plurality of holders each adapted to be loaded with a product-filled package, an ejecting mechanism alongside the conveyor and having a product-engaging member adapted to be moved longitudinally through a selected product-filled package, cut-off means for severing each ejected product from an adjoining product, feeder means for directing each ejected and severed product through a discharge opening in the machine, drive means for each of the aforesaid devices, and control means for operating the drive means of the conveyor, the ejecting mechanism, the cut-off means, and the feeder means in timed relation to dispense products from the machine.

4. A machine as claimed in claim 3, in which each of said holders has open ends and a longitudinal slot registerable with a corresponding slot in the product-filled package therein, said product-engaging member projecting through the longitudinal slot as it travels lengthwise of the holder to eject a product from the product-filled package.

5. A machine as claimed in claim 3, in which said feeder means comprises a wheel having circumferentially spaced quadrants defining pockets, one of said pockets temporarily receiving an ejected product while an adjacent quadrant serves as a closure for the discharge opening.

6. A machine as claimed in claim 3, in which each of said drive means comprises an electric motor, said control means comprising an electric circuit for connecting the electric motors to a source of power, said electric circuit including switch means for halting the conveyor with a selected holder in a dispensing position adjacent the ejecting mechanism.

7. A machine as claimed in claim 6, and including other switch means for stopping the ejecting mechanism each time a product is dispensed and prior to operation of the feeder means.

* * * * *